United States Patent [19]

Greene, Jr. et al.

[11] 4,120,543
[45] Oct. 17, 1978

[54] UNITIZED SEALED BALL THRUST BEARING

[75] Inventors: Pliney O. Greene, Jr., Sandusky, Ohio; Darrell D. Pendleton, Belmont, N.C.

[73] Assignee: General Motors Corporation, Detroit, Mich.

[21] Appl. No.: 864,210

[22] Filed: Dec. 27, 1977

[51] Int. Cl.² .................................................. F16C 19/00
[52] U.S. Cl. ................................. 308/233; 308/187.2; 308/235
[58] Field of Search ................ 308/187.1, 187.2, 187, 308/36.1–36.5, 195, 236, 135, 235, 233, 234, 232, 219, 230, 231; 277/92, 95, 153, 163; 192/110 B, 45

[56] References Cited

U.S. PATENT DOCUMENTS

| 2,068,589 | 1/1937  | Annen ......................... 308/230 |
| 2,387,182 | 10/1945 | Procter ........................ 308/233 |
| 3,384,428 | 5/1968  | Hodge .......................... 308/135 |
| 3,811,744 | 5/1974  | Wren et al. ................... 308/235 |
| 3,844,631 | 10/1974 | Otto ............................ 308/187.1 |
| 3,951,482 | 4/1976  | Blaydon et al. ............... 308/187.1 |
| 3,963,248 | 6/1976  | Bainard ........................ 277/92 |
| 3,981,549 | 9/1976  | Carullo ........................ 308/235 |

FOREIGN PATENT DOCUMENTS 1,341,765  9/1963  France ................................. 308/187.2

*Primary Examiner*—Trygve M. Blix
*Assistant Examiner*—Douglas C. Butler
*Attorney, Agent, or Firm*—F. J. Fodale

[57] ABSTRACT

A ball thrust bearing comprises a pair of stamped sheet metal races and a full complement of bearing balls. One race has bonded elastomeric sealing lips which cooperate with the other race to seal the inner and outer diameter sides of the bearing respectively. The sealing lip for the inner diameter side of the bearing retains the bearing components in a unitized assembly and is also designed to permit snap assembly of the races. The races and sealing lips are shaped to provide effective sealing, effective retention and ease of assembly.

3 Claims, 3 Drawing Figures

UNITIZED SEALED BALL THRUST BEARING

This invention relates generally to antifriction bearings and more particularly to sealed antifriction bearings designed primarily to carry a thrust load.

The French Pat. No. 1,341,765 to Industriewerk Schaeffler O.H.G. discloses several embodiments of a roller thrust bearing characterized by a thick ring of elastic material mounted on one race ring to overcome centering or machining defects. The ring of elastic material is further characterized by having at least one integral portion in sliding contact with the other race ring (or an element solid therewith) to seal the space between the race rings containing the rollers. The embodiments shown in FIGS. 7 and 8 are completely sealed and comprise an upper, cup shaped sheet metal bearing race, a lower race ring, a caged complement of rollers and a thick ring of elastomeric material mounted on the lower race ring. This elastomeric ring has an integral outer circular sealing lip (FIG. 7) or a conical groove (FIG. 8) which slidably engages a flange of the cup shaped upper bearing race to seal the outer diameter side of the bearing. In both embodiments, the elastomeric ring has an integral sleeve portion at its internal periphery which terminates in an outward facing flange shaped collar which slidably engages the outside surface of the upper bearing race to seal the inner diameter side of the bearing.

The Schaeffler patent thus discloses a thrust bearing which is sealed at both the inner and outer diameter sides of the bearing. The Schaeffler bearing, however, is not of unitized construction as the bearing components themselves are not retained together in an assembly to any substantial degree.

The object of our invention is to provide a thrust bearing which is sealed at both the inner and outer diameter side of the bearing and which has the bearing components themselves securely retained together in a unitized assembly.

Another object of our invention is to provide an antifriction thrust bearing of unitary construction characterized by an elastomeric lip attached to one race which cooperates with the other race to form a seal at one side of the bearing and retain the bearing components together in a unitized assembly.

Yet another object of our invention is to provide a sealed antifriction thrust bearing of unitized construction characterized by an elastomeric lip attached to one race and adapted for snap assembly with the other race to securely retain the same and seal one side of the bearing.

Other objects and features of the invention will become apparent to those skilled in the art as the disclosure is made in the following detailed description of a preferred embodiment of the invention as illustrated in the accompanying sheet of drawing in which.

Figure 1:
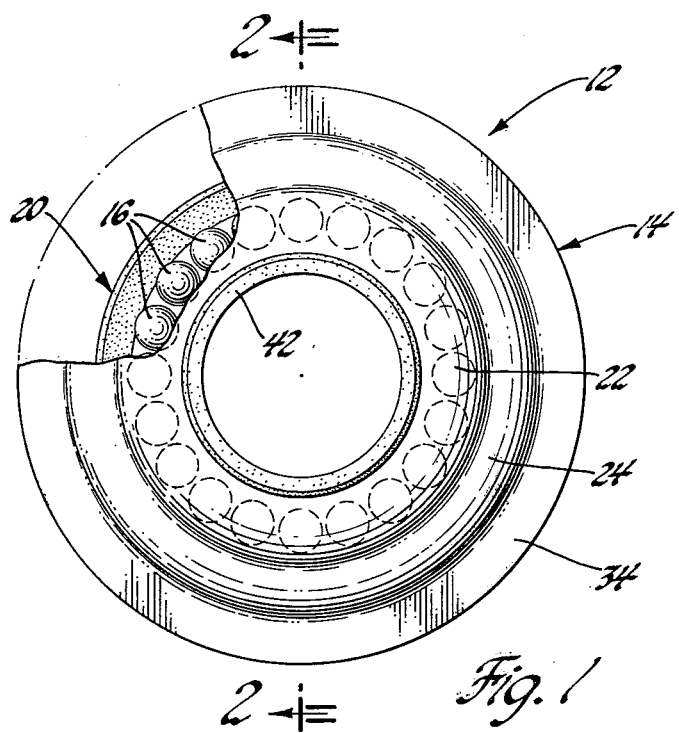
FIG. 1 is a front view, partially broken away, of a unitized sealed antifriction bearing in accordance with our invention.

Referring now to the drawing, our invention is embodied in the antifriction bearing 12 comprising a first bearing race 14, a full complement of bearing balls 16 and a second bearing race 18 having a bonded elastomeric body 20 of rubber or the like.

The bearing race 14 is of one piece sheet metal construction and shaped with two concentric cup portions 22 and 24. The inner cup portion 22 is contoured to provide a curvilinear raceway 23 engaging the bearing balls 16 to transfer loads on a skewed axis at a contact angle a of about 30°. The inner cup portion 22 also has an attached circular protrusion 26 which provides one of the cooperating retaining elements for unitizing the bearing assembly. The protrusion 26 is preferably at the terminus of an inner conical skirt 28 which is inclined toward the race 18 to minimize space requirements in the axial direction as well as improve retention as will hereinafter more fully appear.

The outer cup portion 24 provides a generally radial internal annular sealing surface 30 engaged by an integral circular sealing lip 32 of the elastomeric body 20. The circular sealing lip 32 extends generally axially from the bearing race 18 toward the bearing race 14 and is protected by the outer cup portion 24 surrounding it. The bearing race 14 may also include an outer radial flange portion 34 integrally attached to the outer cup portion 24.

The bearing race 18 is a ring generally concavo-convex in half section. The flared inner portion 36 is inclined toward the bearing race 14 to provide a curvilinear raceway 38 engaging the bearing balls 16 and a terminus 40 in close proximity to the protrusion 26. The raceway 38 is complementary to the raceway 23 and thus the bearing 12 carries radial components as well as axial components of bearing load and provides self centering of the bearing races 14 and 18 with respect to each other.

The elastomeric body 20 bonded to the bearing race 18 has an inner circular sealing lip 42 which projects beyond the terminus 40.

The sealing lip 42 has a radially outwardly facing generally V-shaped notch 44 which cooperates with the protrusion 26 also generally V-shaped to retain the bearing components in a unitized assembly as well as provide a labyrinth seal at the inner side of the bearing. Location of the terminus 40 in close proximity to the protrusion 26 results in a minimal extension of the sealing lip 42 beyond the bearing race 18 and consequently the sealing lip 42 is of sufficient stiffness to permit snap assembly of the bearing races 14 and 18 and provide subsequent secure retention of the bearing components 14, 16 and 18 in a unitized assembly.

Figure 2:
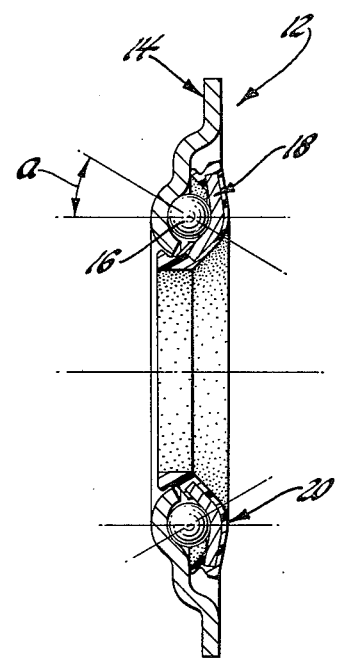
FIG. 2 is a section taken substantially along the line 2—2 of FIG. 1 and looking in the direction of the arrows.
Figure 3:
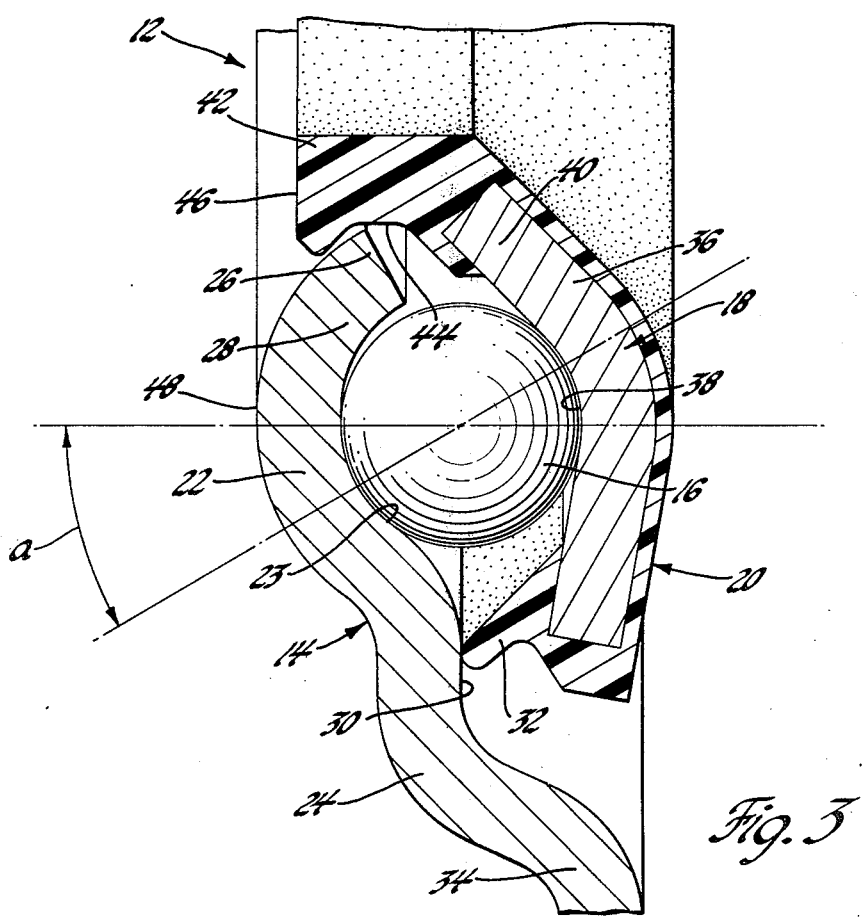
FIG. 3 is an enlargement of a portion of FIG. 2.

As illustrated in the drawing, particularly FIG. 2, the cooperating retention and sealing means may also be conveniently configured so that the axial extremity 46 of the sealing lip 42 is axially spaced from the axial extremity 48 of the bearing race 14 to protect the sealing lip 42 during bearing operation.

In the particular embodiment illustrated the sealing lips 32 and 42 are an integral part of a single elastomeric body 20. This facilitates molding and bonding the sealing lips 32 and 42 to the bearing race 18 and provides a consequent outer protective coating for the bearing race 18.

Alternately the sealing lips 32 and 42 may be separate and the outer protective coating of the bearing race 18 eliminated. However this alternative still has the advantage of both sealing lips being bonded to the same bearing race to simplify manufacture.

We wish it to be understood that we do not desire to be limited to the exact details of construction shown and described, for obvious modifications will occur to a person skilled in the art.

What is claimed is:

1. A unitized sealed thrust bearing comprising:

a first bearing race having a circular protrusion at the terminus of a conical skirt inclined toward a second bearing race, a complement of antifriction elements disposed between said bearing races and rollably engaging respective confronting bearing raceways thereof, said second bearing race further having inner and outer circular sealing lips of elastomeric material bonded thereto which cooperate with surfaces of said first race to provide seals between the bearing races radially inwardly and outwardly of the antifriction elements, one of said sealing lips being attached to a flared portion of the second bearing race in close proximity to the circular protrusion and having a radially facing circular notch receiving the circular protrusion to provide a unitized assembly, said one sealing lip being of sufficient stiffness to permit snap assembly of the bearing races and the subsequent secure retention of the bearing components in a unitized assembly.

2. A unitized sealed thrust bearing comprising:

a first bearing race of sheet metal construction having a circular protrusion at the terminus of a conical skirt inclined toward a second bearing race of sheet metal construction having a shape which is generally concavo-convex in half section, a complement of bearing balls disposed between said bearing races and rollably engaging respective confronting curvilinear bearing raceways thereof, said second bearing race further having inner and outer circular sealing lips of elastomeric material bonded thereto which cooperate with surfaces of said first race to provide seals between the bearing races radially inwardly and outwardly of the bearing balls respectively, one of said sealing lips being attached to a flared portion of the second bearing race which is inclined toward the first bearing race and has a terminus in close proximity to the circular protrusion, said one sealing lip having a radially facing circular notch receiving the circular protrusion to provide a unitized assembly and being of sufficient stiffness to permit snap assembly of the bearing races and the subsequent secure retention of the bearing components in a unitized assembly.

3. A unitized sealed thrust bearing comprising:

a first bearing race of sheet metal construction having a circular protrusion at the terminus of a conical skirt inclined toward a second bearing race of sheet metal construction having a shape which is generally concavo-convex in half section, a complement of bearing balls disposed between said bearing races and rollably engaging respective confronting curvilinear bearing raceways thereof, said second bearing race further having inner and outer circular sealing lips of elastomeric material bonded thereto which cooperate with surfaces of said first race to provide seals between the bearing races radially inwardly and outwardly of the bearing balls respectively, said inner sealing lip being attached to a flared portion of the second bearing race and extending beyond a terminus of the flared portion which lies in close proximity to the circular protrusion, said inner sealing lip having a radially inwardly facing circular notch receiving the circular protrusion to provide a unitized assembly and being of sufficient stiffness to permit snap assembly of the bearing races and the subsequent secure retention of the bearing components in a unitized assembly, said outer sealing lip extending generally axially from the second bearing race toward the first bearing race and being surrounded by an outer cup portion thereof.

* * * * *

UNITED STATES PATENT AND TRADEMARK OFFICE
CERTIFICATE OF CORRECTION

PATENT NO. : 4,120,543

DATED : October 17, 1978

INVENTOR(S) : Pliney O. Greene, Jr. & Darrell D. Pendleton

It is certified that error appears in the above-identified patent and that said Letters Patent are hereby corrected as shown below:

Item [73], Title page, assignee should read

-- General Motors Corporation, Detroit Michigan;

Garlock, Inc., Palmyra, New York, a part interest each--.

Signed and Sealed this

Fourteenth Day of October 1980

[SEAL]

*Attest:*

SIDNEY A. DIAMOND

*Attesting Officer*     *Commissioner of Patents and Trademarks*